(12) United States Patent
Craig et al.

(10) Patent No.: US 10,883,415 B2
(45) Date of Patent: Jan. 5, 2021

(54) FUEL BYPASS SYSTEM FOR GASEOUS-FUELED ENGINE

(71) Applicant: Generac Power Systems, Inc., Waukesha, WI (US)

(72) Inventors: Steven W. Craig, Big Bend, WI (US); Andrew P. Sibrel, Oconomowoc, WI (US); Aaron J. Baska, Greenfield, WI (US); Douglas R Clement, Wind Lake, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 0 days.

(21) Appl. No.: 16/373,791

(22) Filed: Apr. 3, 2019

(65) Prior Publication Data

US 2019/0331020 A1  Oct. 31, 2019

Related U.S. Application Data (60) Provisional application No. 62/652,186, filed on Apr. 3, 2018.

(51) Int. Cl.
  *F02B 29/04* (2006.01)
  *F02B 3/04* (2006.01)

(52) U.S. Cl.
  CPC ............ *F02B 29/0431* (2013.01); *F02B 3/04* (2013.01); *F02B 29/0475* (2013.01)

(58) Field of Classification Search
  CPC .............. F02B 29/0418; F02B 29/0431; F02B 29/0475; F02B 3/04; F02B 37/007; F02D 29/06; F02D 41/0007; F02D 41/0027; F02D 41/061; F02D 19/02; F02D 41/0087; F02D 41/062; F02M 21/04
  See application file for complete search history.

(56) References Cited

U.S. PATENT DOCUMENTS

| 2011/0077847 A1* | 3/2011 | Barr ...................... F02D 19/023 |
| | | 701/113 |
| 2013/0090839 A1* | 4/2013 | Ishigami ............. F02D 41/0002 |
| | | 701/108 |
| 2018/0135571 A1* | 5/2018 | Fuchs ................... F02D 41/062 |

FOREIGN PATENT DOCUMENTS

| DE | 10 2014 006 019 A1 | 10/2015 |
| WO | 2007/119072 A1 | 10/2007 |
| WO | 2016/172748 A1 | 11/2016 |

OTHER PUBLICATIONS

International Search Report and Written Opinion for Application No. PCT/US2019/025192 dated Jul. 5, 2019.

\* cited by examiner

*Primary Examiner* — Brandon D Lee
(74) *Attorney, Agent, or Firm* — Merchant & Gould P.C.

(57) ABSTRACT

A method of operating a forced induction gaseous-fueled engine includes mixing gaseous-fuel and engine intake air to form a mixture at a fuel mixer. The method includes delivering the mixture to an intake manifold by at least partially bypassing a charge air cooler.

25 Claims, 6 Drawing Sheets

FUEL BYPASS SYSTEM FOR GASEOUS-FUELED ENGINE

CROSS REFERENCE TO RELATED APPLICATION

The present application claims priority to U.S. Provisional Application No. 62/652,186, filed Apr. 3, 2018. The disclosure of this application is hereby incorporated by reference in its entirety.

BACKGROUND

Fast start-up times are advantageous for gaseous-fueled (e.g., natural gas, propane, methane, hydrogen, well gas, and/or blends of such fuels) engines. The faster the start-up time, the sooner a load can be applied to an engine. However, this is oftentimes difficult to accomplish due to an incombustible (i.e., "stale") fuel/air mixtures existing in the intake system from the previous operation or idleness of the gaseous-fueled engine. This is a particular problem encountered more frequently in gaseous-fueled engines, in comparison to liquid fuel engines, due to the properties of the gaseous fuel. This stale mixture is often very difficult to combust, and therefore must be exhausted (via passing it through engine cylinders) before the gaseous-fueled engine can achieve steady consistent operation. Therefore, during start-up, gaseous-fueled engines often experience a rough, or bumpy, start-up operation.

In forced induction gaseous-fueled engines, fuel and intake air are mixed at a mixer and provided to a compression device (i.e., a turbocharger) for compression. Because the compression device heats up the fuel/air mixture, the fuel/air mixture is often cooled via a charge air cooler (CAC) (also known as an "intercooler") before being delivered to an engine intake. Therefore, after shut down of the gaseous-fueled engine, the CAC includes a large amount of uncombusted mixture. The uncombusted mixture becomes stale and incombustible over time. In order to start the engine again, the incombustible contents of the CAC, and associated tubing, must be exhausted by traveling through the engine first. This can take up considerable time and increase the start-up time.

In power backup systems that utilize a generator for backup power, fast start-up is desired. Because it is inefficient to constantly have the backup generator running before the generator is needed, in some examples the backup generator will be started when the power from the main power source (e.g., a power grid) goes out. In some examples, buildings often utilize a backup battery bank to supply electrical power to a building during the time period from when the main power source power supply goes out and when a backup generator starts supplying backup power. Backup battery systems are both expensive and require a storage space. Therefore, the faster the generator can start-up and supply electrical power, the smaller the backup battery bank can be, Therefore, improvements in the operation of gaseous-fueled engines are desired.

SUMMARY

The present disclosure relates generally to gaseous-fueled generators. In one possible configuration, and by non-limiting example, a bypass system for a gaseous-fueled generator that allows a fuel/air mixture to bypass a charge air cooler during startup is disclosed.

In one example of the present disclosure, a method of operating a forced induction gaseous-fueled engine is disclosed. The method includes mixing gaseous-fuel and engine intake air to form a mixture at a fuel mixer. The method includes delivering the mixture to an intake manifold by at least partially bypassing a charge air cooler.

In another example of the present disclosure, a fuel bypass arrangement for a forced induction gaseous-fueled engine is disclosed. The fuel bypass arrangement includes a compressed fuel/air mixture line that is configured to transport a compressed fuel/air mixture. The fuel bypass arrangement includes a charge air cooler positioned between, and in fluid communication with, the compressed fuel/air mixture line and a throttle valve. The charge air cooler is configured to reduce a temperature of the fuel/air mixture as the fuel/air mixture travels from an inlet to an outlet of the charge air cooler. The throttle valve is positioned between, and in fluid communication with, the charge air cooler and an intake manifold. The throttle valve is configured to control the amount of fuel/air mixture that is delivered to the intake manifold from the charge air cooler. The fuel bypass arrangement includes a bypass line in fluid communication with the compressed fuel/air mixture line, upstream from an inlet of the charge air cooler and the intake manifold and downstream from the throttle valve. The fuel bypass arrangement includes a bypass valve in fluid communication with the bypass line. The bypass valve is configured to selectively control the flow of the fuel/air mixture through the bypass line.

In one example of the present disclosure, a method of operating a forced induction gaseous-fueled engine is disclosed. The method includes initiating a starting sequence of a gaseous-fueled engine and at least partially closing a throttle valve. The method includes delivering a fuel/air mixture to a bypass fuel/air mixture line and at least partially bypassing a charge air cooler by delivering the fuel/air mixture via the bypass line directly to an intake manifold. The method includes at least partially opening the throttle valve, after at least partially bypassing the charge air cooler. The method includes delivering the fuel/air mixture via both the bypass line and through the charge air cooler, after at least partially opening the throttle valve.

In another example of the present disclosure, a system is disclosed. The system includes a data storage device for storing data instructions that, when executed by a processing device of an engine, cause the processing device to receive an engine startup signal. The instructions cause the processing device to initiate a starting sequence of a gaseous-fueled engine. The instructions cause the processing device to at least partially close a throttle valve. The instructions cause the processing device to deliver a fuel/air mixture to a bypass fuel/air mixture line. The instructions cause the processing device to at least partially bypass a charge air cooler by delivering the fuel/air mixture via the bypass fuel/air mixture line directly to an intake manifold. The instructions cause the processing device to at least partially open the throttle valve after at least partially bypassing the charge air cooler. The instructions cause the processing device to deliver the fuel/air mixture via both the bypass line and through the charge air cooler after at least partially opening the throttle valve.

In another example of the present disclosure, a gaseous-fuel generator comprising is disclosed. The gaseous-fuel generator includes a compression device and a charge air cooler positioned downstream from the compression device. The gaseous-fuel generator includes an intake manifold positioned downstream from the charge air cooler. The gaseous-fuel generator includes a bypass line that is connected upstream from the charge air cooler and downstream from the charge air cooler to the intake manifold. The gaseous-fuel generator includes a combustion system for generating mechanical power and an electricity generating system for generating electrical power from the combustion system.

In another example of the present disclosure, a power backup system is disclosed. The power backup system includes a generator. The generator includes a compression device and a charge air cooler positioned downstream from the compression device. The gaseous-fuel generator includes an intake manifold positioned downstream from the charge air cooler. The gaseous-fuel generator includes a bypass line that is connected upstream from the charge air cooler and downstream from the charge air cooler to the intake manifold. The gaseous-fuel generator includes a combustion system for generating mechanical power and an electricity generating system for generating electrical power from the combustion system. The power backup system includes a transfer switch connected to an electrical load, the generator, and a main power source. The transfer switch is configured to connect the electrical load to either the generator or the main power source.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

Corresponding reference characters indicate corresponding parts throughout the several views. The exemplifications set out herein illustrate an embodiment of the invention, and such exemplifications are not to be construed as limiting the scope of the invention in any manner.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The bypass system disclosed herein has a plurality of advantages. For example, the bypass system can improve the overall starting performance of a forced induction gaseous-fueled engine. In some examples, the bypass system can enable a forced induction gaseous-fueled engine to reach a normal operation within a predetermined time period (e.g., less than 10 seconds). In some examples, the bypass system can be utilized in a forced induction gaseous-fueled engine in a backup generator, thereby aiding the generator in restoring normal power to a building faster.

Figure 1:
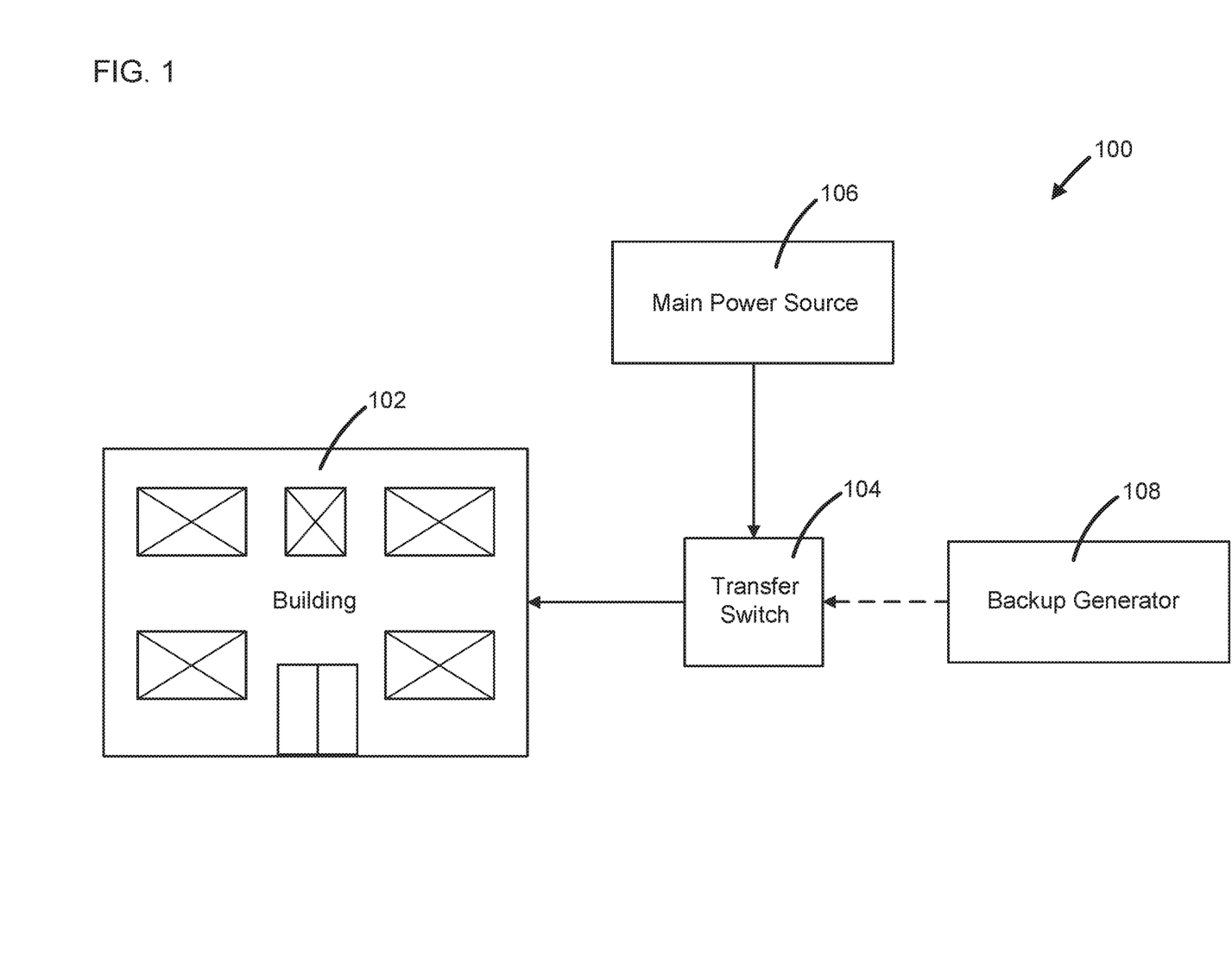
FIG. 1 is a schematic view of a power backup system, according to one example of the present disclosure.

FIG. 1 depicts a power backup system 100 connected to a building 102. The power backup system 100 is configured to ensure the building 102 is not deprived of electrical power for an extended period of time. The building 102 can be any of variety of structures. In some examples, the building 102 can be, but is not limited to, a structure such as a house or a commercial building (e.g., a hospital, data center, manufacturing facility, etc.) In other examples, the building 102 can be represent a generic external electrical load connected to the power backup system. In such an example, the building 102 can represent, for example, a worksite.

The power backup system 100 includes a transfer switch 104 connected to a main power source 106 and to at least one backup generator 108. Specifically, the transfer switch 104 electrically connects the building 102 to either the main power source 106 or the backup generator 108. In some examples, the transfer switch 104 can be configured to supply the building 102 with electricity from both the main power source 106 and the backup generator 108.

The transfer switch 104 can be any of a variety of transfer switches known in the art. In some examples, the transfer switch 104 is automatic and senses the electrical supply from the main power source 104 and/or the generator 108. The transfer switch 104 can automatically toggle the electrical connection with the building 102 between the main power source 106 and the generator 108 based on sensed parameters. In other examples, the transfer switch is manually actuated.

The main power source 106 can be any one of a variety of electrical power sources. In one example, the main power source 106 can be, but is not limited to, a power grid (e.g., a municipal power grid), a power plant, and/or a renewable power source (e.g., wind, solar, hydroelectric, etc.).

The generator 108 is configured to output electrical power by transforming mechanical power generated by an engine 109 into electricity. In some examples, the generator 108 is gaseous fueled. However, in some examples, the generator 108 can be fueled by gasoline, diesel, or other types of fuel. In some examples, the engine 109 has about a 1.5 liter displacement. In some examples, the engine 109 has a displacement greater than 1.5 liters. In some examples, the engine 109 has a displacement less than 1.5 liters. In some examples, the engine 109 has about a 33.9 liter displacement. In some examples, the engine 109 has a displacement less than 33.9 liters. In some examples, the engine 109 has a displacement greater than 33.9 liters. In some examples, the generator 108 is configured to output less than about 35 kilowatts of electrical power. In some examples, the generator 108 is configured to output greater than about 35 kilowatts of electrical power. In some examples, the generator 108 is configured to output about 625 kilowatts of electrical power. In some examples, the generator 108 is configured to output greater than 625 kilowatts of electrical power. In some examples, the generator 108 is configured to output less than 625 kilowatts of electrical power. However, it is considered within the scope of the present disclosure that the generator 108 and associated engine 109 can be of a variety of different sizes and have a variety of different outputs.

During normal operation of the system 100, the transfer switch 104 connects the building 102 to the main power source 106 so that the main power source 106 can supply electricity to the building 102. During normal operation of the system 100, the transfer switch 104 ensures the backup generator 108 is electrically disconnected from the building 102. Because of this, the backup generator 108 remains turned off when not electrically connected the building 102. When the transfer switch 104 detects a loss of electricity from the main power source 106, the transfer switch 104 automatically electrically connects the building 102 with the generator 108. In some examples, a plurality of generators 108 can be connected to the building 102.

Once the transfer switch 104 senses a loss of power from the main power source 106, the generator 108 is automatically started. Once the generator 108 has reached a normal operation condition, the electrical load of the building 102 is connected with the generator 108 so that the generator 108 can supply backup electricity to the building 102.

Figure 2:
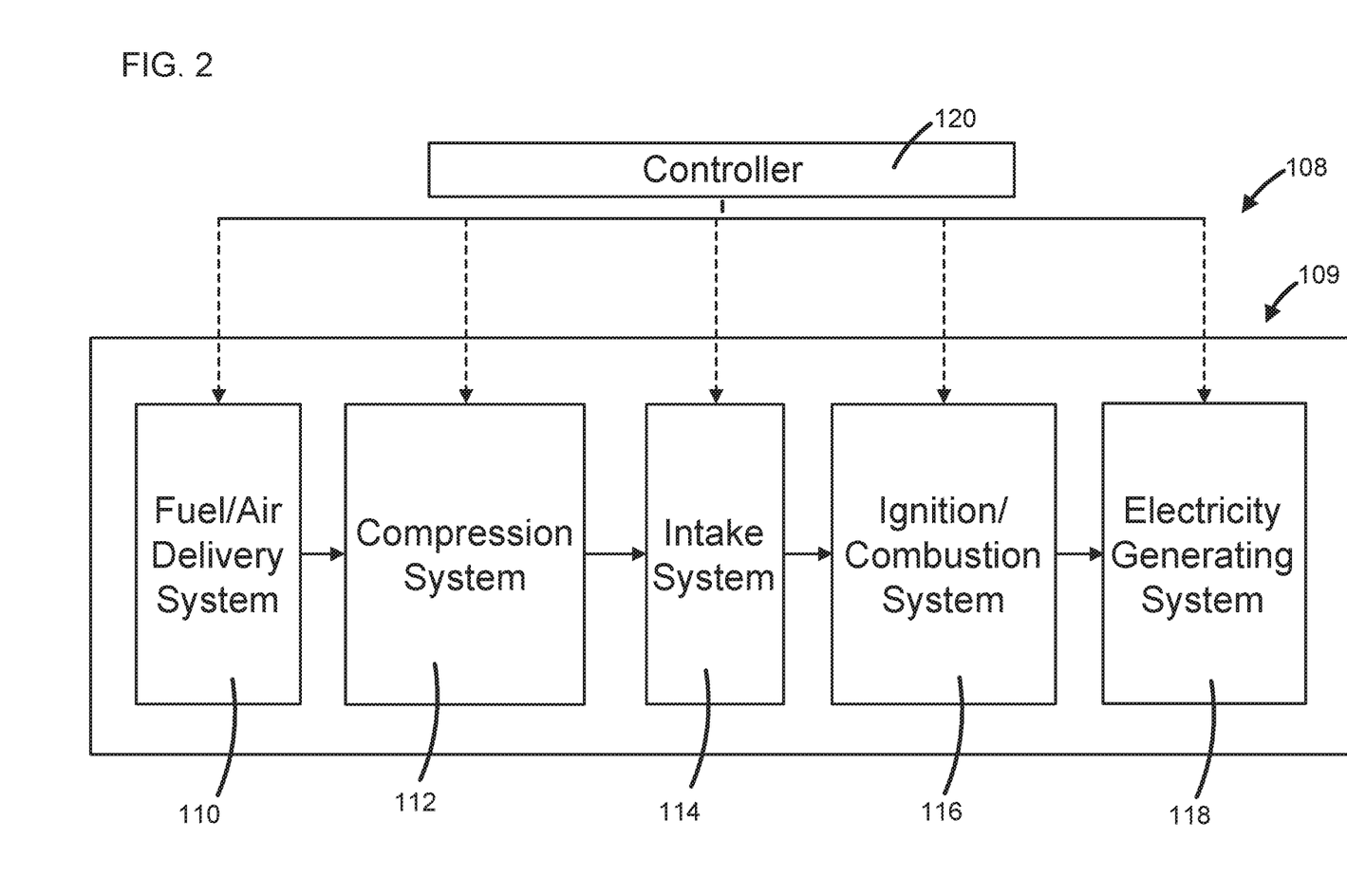
FIG. 2 is a schematic view of a power backup generator, according to one example of the present disclosure.

FIG. 2 depicts a schematic example of the generator 108. In the depicted example, the generator 108 is a gaseous-fueled operated generator. The generator 108 includes a fuel/air delivery system 110, a compression system 112, an intake system 114, a combustion system 116, and an electricity generating system 118. A controller 120 is also provided to control particular operations of the generator 108.

The generator 108 in the depicted example is gaseous fueled. The gaseous fuel can include, but is not limited to, natural gas, propane, methane, hydrogen, well gas, and/or blends of such fuels.

The generator 108 is shown to be a forced induction generator 108. The fuel/air delivery system 110 delivers a fuel/air mixture to the compression system 112. In the depicted example, gaseous fuel is mixed with fresh air to form the fuel/air mixture. The compression system 112 compresses the fuel/air mixture by way of a compression device, such as, but not limited to, a turbocharger and/or a supercharger. The compression system 112 delivers the compressed fuel/air mixture to the intake system 114. The intake system 114 delivers the compressed fuel/air mixture to the combustion system 116. In some examples, the intake system 114 cools the compressed fuel/air mixture. The combustion system 116 combusts the compressed fuel/air mixture within a cylinder bank to produce mechanical power. The electricity generating system 118 transforms the mechanical power created by the combustion system 116 into electrical power that can be at least partially output to an external electrical load, such as to the building 102.

The controller 120 is configured to control at least part of the operation of the fuel/air delivery system 110, the compression system 112, the intake system 114, the combustion system 116, and the electricity generating system 118. In some examples, the controller 120 is onboard the generator 108. In other examples, the controller 120 is located external to (i.e. remote from) the generator 108. In other examples, the controller 120 is part of another external system, such as a building management system In some examples, the controller 120 is operable to execute a plurality of software instructions that, when executed by the controller 120, cause the generator 108 to implement the methods and otherwise operate and have functionality as described herein. The controller 120 may comprise a device commonly referred to as a microprocessor, central processing unit (CPU), digital signal processor (DSP), or other similar device and may be embodied as a standalone unit or as a device shared with components of the generator 108. The controller 120 may include memory for storing the software instructions, or the generator 108 may further comprise a separate memory device for storing the software instructions that is electrically connected to the controller 120 for the bi-directional communication of the instructions, data, and signals therebetween.

Figure 3:
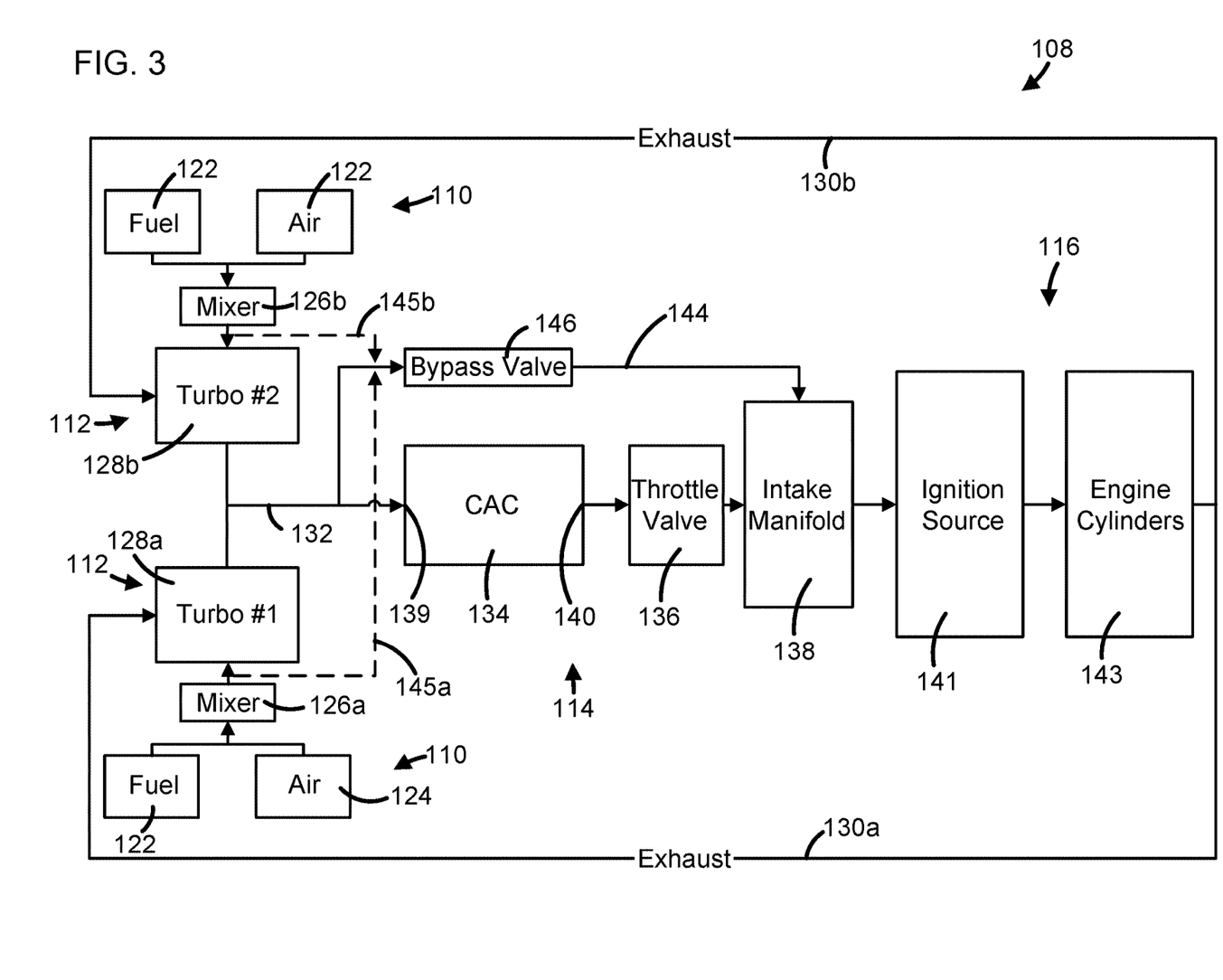
FIG. 3 is a further schematic view of a portion of the power backup generator of FIG. 2.

FIG. 3 shows a detailed schematic view of a portion of the generator 108. The generator 108 is shown to include a fuel bypass system 142. The electricity generating system 118 of the generator 108 is not shown.

The fuel/air delivery system 110 is shown to include a fuel source 122, a fresh air source 124, and a pair of mixers 126a, 126b. In some examples, only a single mixer is utilized. In other examples, more than two mixers are utilized. In the depicted example, the fuel source 122 is a gaseous fuel source. The mixers 126a, 126b are configured to mix the fuel source 122 with the fresh air source 124 to produce a fuel/air mixture having a desired composition. In some examples, the mixers 126a, 126b use a Venturi system to mix the fuel source 122 with the fresh air source 124. In some examples, the mixers 126a, 126b can be controlled by the controller 120 to alter the composition of the fuel/air mixture during operation of the generator 108.

The compression system 112 is shown to include a pair of compression devices 128a, 128b. In some examples, the compression devices 128a, 128b are turbochargers; however, it is considered within the scope of the present disclosure that a variety of different types of compression devices can be used including, but not limited to, a supercharger. The compression devices 128a, 128b can be any type of turbocharger and are operable to compress the fuel/air mixture received from the mixers 126a, 126b, respectively. In some examples, the compression devices 128a, 128b are operated by way of an exhaust stream 130a, 130b from the combustion system 116. In some examples, only a single compression device is utilized. In other examples, more than two compression devices are utilized. The compression devices 128a, 128b deliver the compressed fuel/air mixture to a compressed fuel/air mixture line 132.

The intake system 114 is configured to deliver the compressed fuel/air mixture from the compressed fuel/air mixture line 132 to the combustion system 116. The intake system 114 includes a charge air cooler (CAC) 134, a throttle valve 136, and an intake manifold 138. During normal operation, the compressed fuel/air mixture passes through the CAC 134, through the throttle valve 136, into the intake manifold 138, and into the combustion system 116. By modulating the position of the throttle valve 136, the flow of the fuel/air mixture through the intake system 114 can be controlled.

The CAC 134 (also known as an intercooler) is configured to cool the compressed fuel/air mixture received at a charge air cooler inlet 139 and output the cooled compressed fuel/mixture to a charge air cooler outlet 140.

The throttle valve 136 is a valve that is controllable either mechanically or electrically between a closed position and a plurality of open positions. In some examples, the throttle valve 136 can be operated by the controller 120. In some examples, the size of the opening of the throttle valve 136 when the throttle valve 136 is in the open position depends on a variety of different parameters including, but not limited to, a generator operating characteristic.

The intake manifold 138 is configured to deliver the compressed fuel/air mixture to the combustion system 116 for ignition. In some examples, the intake manifold 138 can receive a fuel/air mixture from multiple sources, not just from the CAC 134.

The combustion system 116 includes an ignition source 141 (e.g., a spark, ignition coil, etc.) to combust the fuel/air mixture within engine cylinders 143. In some examples, the engine cylinders are oriented in a V-shape. In some examples, the engine includes between two and twenty cylinders. In some examples, the engine 109 includes twelve engine cylinders 143. In some examples, the engine 109 includes ten engine cylinders 143. In some examples, the engine 109 includes eight engine cylinders 143$n$ some examples, the engine 109 includes six engine cylinders 143. In some examples, the engine 109 includes four engine cylinders 143. In some examples, the engine 109 includes three engine cylinders 143.

In some examples, the ignition source 141 can be altered based on performance of the generator 108. In some examples, the ignition source intensity, the ignition source duration, and the ignition source timing can be actively altered by the controller 120 during operation of the generator 108. In some examples, the ignition source intensity and the ignition source duration can be increased while the fuel bypass system 142 is being utilized.

The fuel bypass system 142 is configured to selectively allow the compressed fuel/air mixture to bypass the CAC 134. The fuel bypass system 142 is also shown to bypass the throttle valve 136. The fuel bypass system 142 includes a fuel bypass line 144 and a bypass valve 146.

The fuel bypass line 144 is connected to the compressed fuel/air mixture line 132, upstream from the inlet 139 of the CAC 134. The fuel bypass line 144 is also connected the intake manifold 138, downstream from the outlet 140 of the CAC 134 and downstream from the throttle valve 136. In some examples, the fuel bypass line 144 can be sized to allow a smaller volume of the fuel/air mixture to flow there along, in comparison to the volume of the fuel/air mixture that flows along the intake system 114 (i.e., though the CAC 134) during normal operation.

In some examples, the fuel bypass line 144 is connected upstream from compression devices 128$a$, 128$b$ and downstream from the mixers 126$a$, 126$b$ via compression bypass lines 145$a$, 145$b$, respectively. In some examples, the fuel bypass line 144 is connected to the compression bypass lines 145$a$, 145$b$ instead of, or in addition to, the compressed fuel/air mixture line 132. The compression bypass lines 145$a$, 145$b$ allow the fuel/air mixture to bypass the compression devices 128$a$, 128$b$. The compression bypass lines 145$a$, 145$b$ allow uncompressed fuel/air mixture to flow via the bypass line 144 to the intake manifold 138.

The fuel bypass valve 146 is positioned on the fuel bypass line 144 to selectively control flow of the compressed fuel/air mixture along the bypass line 144. In some examples, the bypass valve 146 is controllable via the controller 120. In some examples, the fuel bypass valve 146 is biased to a closed position, thereby preventing flow along the bypass line 144. In other examples, the bypass valve 146 is biased to an open position, thereby allowing flow along the bypass line 144. In some examples, the bypass valve 146 can be controlled so as to have a plurality of open positions to meter the flow of the fuel/air mixture along the bypass line 144.

Figure 4:
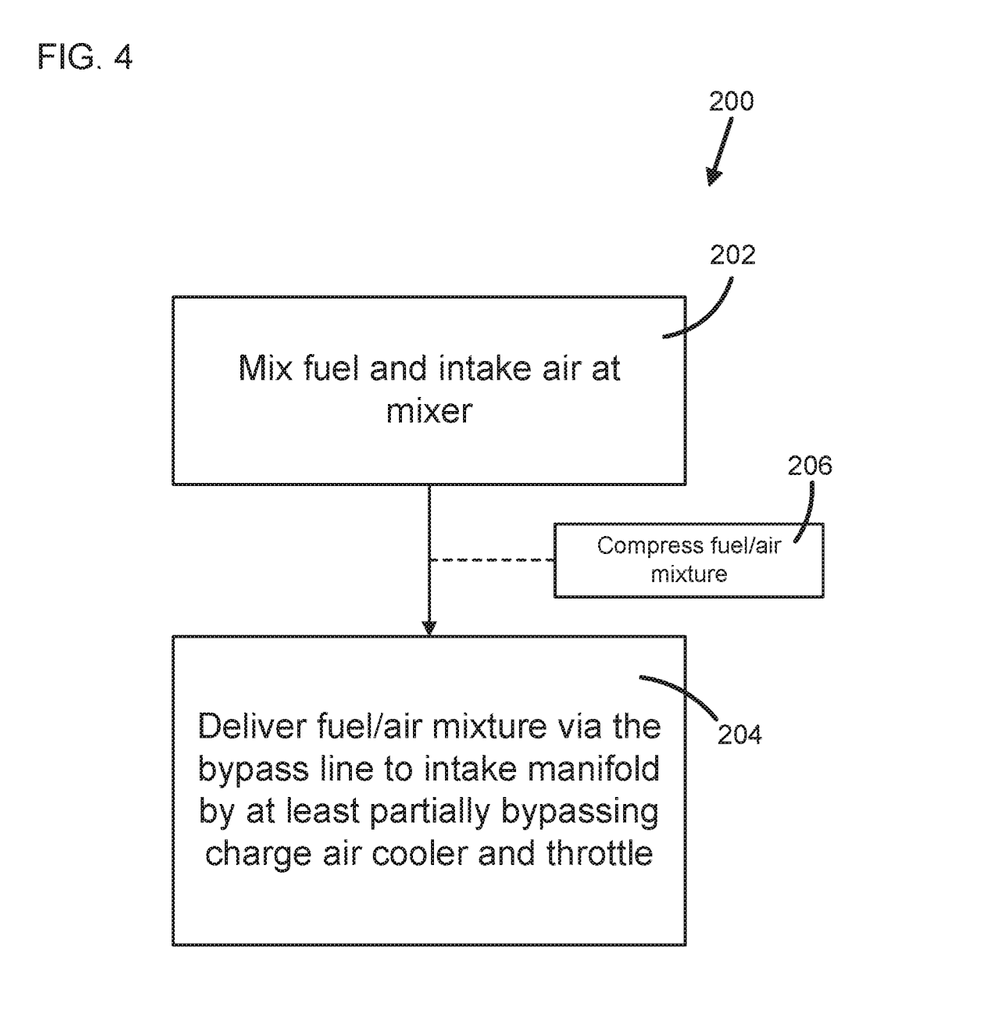
FIG. 4 is a schematic of an example operation of the power backup generator of FIG. 2.

FIG. 4 shows an example operation 200 of the generator 108. In some examples, the operation 200 can be a bypass operation utilizing the bypass system 142. At step 202, the fuel source 122 is mixed with the fresh air source 124. In some examples, the mixing can occur at the mixers 126$a$, 126$b$. At step 204, after the fuel source 122 is mixed with the fresh air source 124, the mixture is then delivered via the bypass line 144 to the intake manifold 138. When delivering the mixture via the bypass line 144, the mixture bypasses the CAC 134 and the throttle valve 136. In some examples, while simultaneously delivering the mixture via the bypass line 144, the fuel/air mixture can also at least partially flow through the CAC 134 and the throttle 136.

In some examples, before the fuel/air mixture is delivered to the intake manifold, at step 206 the fuel/air mixture can be compressed by at least one of the compression devices 128$a$, 128$b$.

Figure 5:
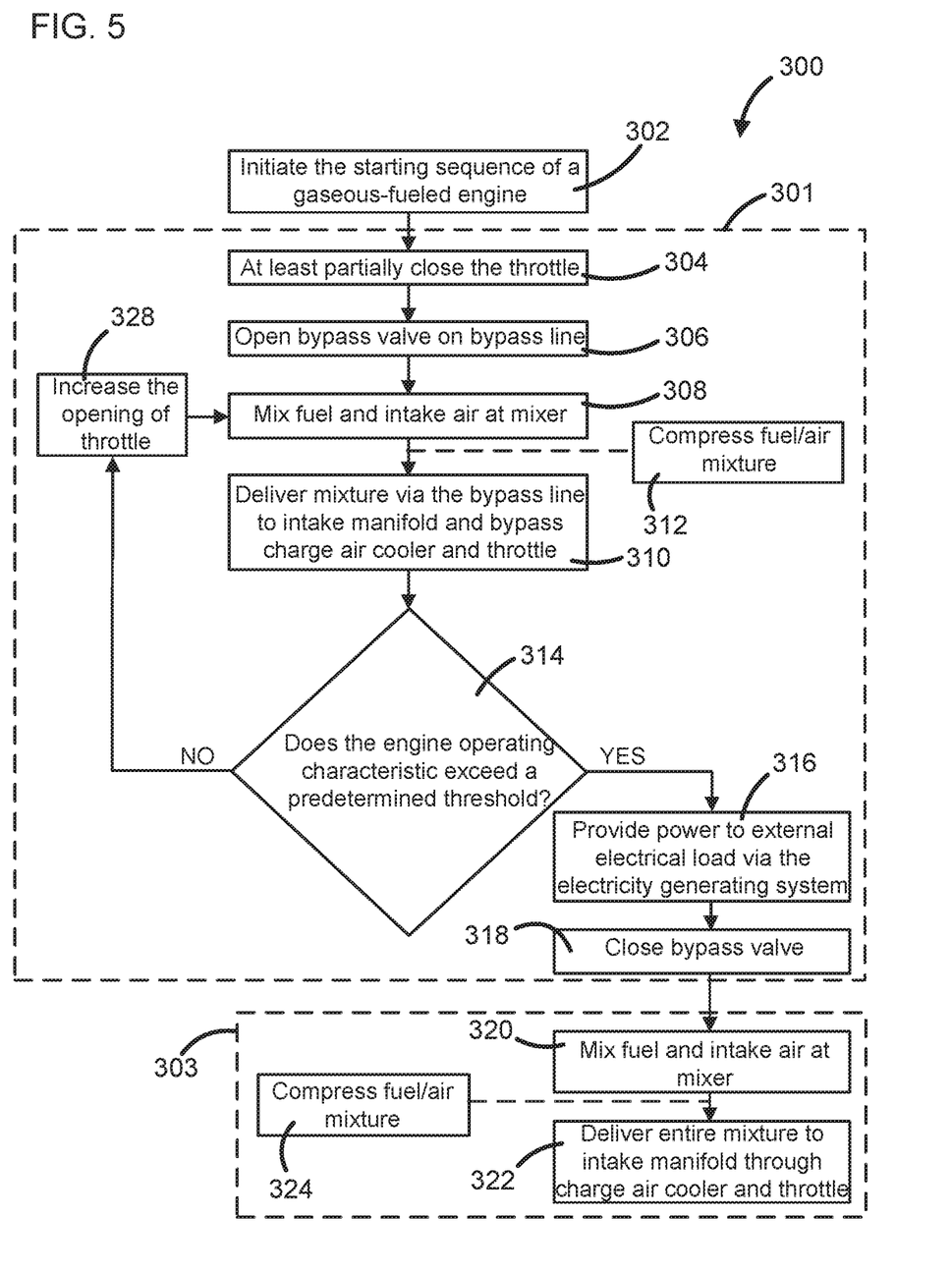
FIG. 5 is schematic of another example operation of the power backup generator of FIG. 2.

FIG. 5 shows another example operation 300 of the generator 108. The operation 300 includes a bypass operation 301 and a normal operation 303. In some examples, the operation 300 depicts the operation of the generator 108 from the instance the building 102 is in need of backup power to the point when the generator 108 supplies electrical power to the building 102. The steps shown in FIG. 5 can be performed in the order shown, performed in a different order than shown, performed excluding select steps, and/or performed including additional steps.

At step 302, a starting sequence of the engine 109 is initiated to begin startup of the engine 109. The starting sequence can be automatically triggered or manually triggered. In some examples, the transfer switch 104 can initiate the starting sequence when the transfer switch 104 senses that the main power source 106 has gone out. In some examples, the controller 120 can initiate the starting sequence when the controller 120 senses that the main power source 106 has gone out. In some examples, the starting sequence is triggered remotely from the generator 108. For example, a building management system can trigger the starting sequence when the power goes out in the building 102. In some examples, the starting sequence includes, but is not limited to, initiating a rotating of a crankshaft (not shown) of the engine 109 (i.e., cranking) and/or activating the ignition source 141.

At step 304, the throttle valve 136 is at least partially closed during startup of the engine 109 of the generator 108. In some examples, the throttle valve 136 is entirely closed for at least a portion of the startup of engine 109. In some examples, the controller 120 can close the throttle valve 136 during startup. In some examples, the controller 120 can close the throttle valve 136 simultaneously when the starting sequence is initiated. In some examples, the controller 120 can close the throttle valve 136 shortly after the starting sequence is initiated. In some examples, the throttle valve 136 is biased closed and therefore remains in the closed position during the starting sequence until the controller 120 opens the throttle valve 136.

At step 306, the bypass valve 146 located on the bypass line 144 is opened. In some examples, the bypass valve 146 is entirely opened at startup of the engine 109. In some examples, the bypass valve 146 is partially opened at startup of the engine 109. In some examples, the controller 120 can open the bypass valve 146 during startup. In some examples, the controller 120 can open the bypass valve 146 simultaneously when the starting sequence is initiated. In some examples, the controller 120 can open the bypass valve 146 shortly after the starting sequence is initiated. In some examples, the bypass valve 146 is biased open and therefore remains in the open position during the starting sequence until the controller 120 closes the bypass valve 146.

In some examples, steps 304 and 306 are completed as part of the starting sequence of the engine 109.

At step 308, the fuel source 122 is mixed with the fresh air source 124 by at least one of the mixers 126a, 126b. In some examples, the controller 120 operates the mixers 126a, 126b. In some examples, the controller 120 can alter the proportions of fuel and air being mixed by altering settings of the mixers 126a, 126b. In some examples, at startup of the engine, the controller 120 can operate the at least one mixer 126a, 126b to mix a higher proportion of fuel (richer) in comparison to a proportion of fuel used in a normal operating condition (i.e., after the engine 109 has reached an operating RPM). In some examples, the controller 120 can operate the mixers 126a, 126b based on, but not limited to, engine revolutions per minute (RPM), a timer, engine temperature, or other similar engine operating characteristics.

At step 310, the fuel/gas mixture is delivered via the bypass line 144 to the intake manifold 138. When delivering the fuel/air mixture via the bypass line 144, the fuel/air mixture within the bypass line 144 bypasses the CAC 134 and the throttle valve 136. In some examples, the fuel/air mixture also bypasses the compression devices 128a, 128b via the compression bypass lines 145a, 145b. In some examples, even when the bypass valve 146 is open the fuel/air mixture can partially flow from the inlet 139 to the outlet 140 of the CAC 134 if the throttle valve 136 is not completely in the closed position. Therefore, at all times when the bypass valve 146 is open, regardless of the throttle valve position, the fuel/air mixture at least partially bypasses the CAC 134 and throttle valve 136 via the bypass line 144.

In some examples, before the fuel/air mixture is delivered to the intake manifold 138, at step 312, the fuel/air mixture is compressed by at least one of the compression devices 128a, 128b and delivered to the compressed fuel/air mixture line 132.

As shown and described in FIG. 3, after the fuel/air mixture is delivered to the intake manifold 138, the fuel/air mixture progresses to the engine cylinders 143 where the ignition source 141 ignites the fuel/air mixture to create mechanical power. In some examples, the fuel/air mixture that travels along the bypass line 144 and is delivered to the intake manifold 138 is delivered to less than all the engine cylinders 143. In such an example, the bypass line 144 is sized to carry a volume of fuel/air mixture that is less than the volume required to cause combustion in all of the engine cylinders 143. In some examples, the smaller volume of fuel/air mixture transported via the bypass line can quickly be delivered to the intake manifold 138 so as to further aid in the fast startup of the engine 109. By facilitating combustion in only a select number of cylinders 143 at first, the bypass system 142 allows the engine 109 to be at least partially started without having to supply all cylinders 143 with the combustible fuel/air mixture, which would be more time consuming.

After delivery of the fuel/air mixture, at step 314, an analysis is done to determine if the generator 108 is operating as desired. Such an analysis can be performed by the controller 120. In some examples, the analysis can be performed by comparing an engine operating characteristic to a predetermined operating threshold and then determining if the engine operating characteristic has exceeded the operating threshold. The engine operating characteristic can be one of, but is not limited to, a run-time of the engine, a timer, an RPM of the engine, an engine temperature, an alternator output, an engine fluid temperature, an engine fluid pressure, and/or any other value that is indicative of the operating status of the engine 109. In some examples, the controller 120 analyzes the RPM of the engine and compares it to an RPM operation threshold. In some examples, the RPM operating threshold is between 500 RPM and 1500 RPM. In some examples, the RPM operating threshold is 1000 RPM. In some examples, the RPM operating threshold is less than 500 RPM.

If the engine operating characteristic exceeds the predetermined threshold, the operation 300 progresses to step 316. At step 316, an external electrical load is connected to the electricity generating system 118. In some examples, by exceeding the predetermined threshold, the generator 108 is deemed to be prepared to be connected to an external electrical load, such as the building 102. In some examples, the connection of the external electrical load to the generator is controlled by the transfer switch 104. In some examples, the connection of the external electrical load to the generator 108 is controlled by the controller 120.

In some examples, the generator 108 operates according to the National Fire Protection Association (NFPA®) 110 standard for Emergency and Standby Power Systems. In some examples, the generator 108 restores normal power to the building 102 within 10 seconds from when the starting sequence is initiated. In some examples, the controller 120 compares the run-time of the engine (i.e., time from initiating the starting sequence) to an operation time threshold. In some examples, the operation time threshold is less than or equal to 10 seconds. In some examples, the operation time threshold is less than or equal to 30 seconds. In some examples, the operation time threshold is less than or equal to one minute. In some examples, once the run-time of the engine exceeds the operation time threshold, the electricity generating system 118 of the generator 108 is connected to the building 102 to restore normal power to the building 102. In other examples, the generator 108 operates according to the NFPA® 110 standard for Emergency and Standby Power Systems by comparing the engine operation RPM to a predetermined RPM operation threshold and restores normal power to the building 102 within about 10 seconds.

At step 318, once the predetermined threshold has been exceeded, the bypass valve 146 is closed, thereby ceasing the flow of the fuel/air mixture along the bypass line 144. In some examples, step 316 and step 318 can be performed simultaneously. By closing the bypass valve 146, the bypass operation 301 is closed.

At step 320, the generator 108 begins normal operation 303. The normal operation 303 consists of continuously mixing fuel and air at the mixers 126a, 126b at step 320 and delivering the fuel/air mixture to the intake manifold 138 entirely through the CAC 134 and throttle valve 136 at step 322. In some examples, the fuel/air mixture can be compressed by the compression device 128a, 128b at step 324 before the fuel/air mixture is delivered through the CAC 134 and throttle valve 136 to the intake manifold 138.

If the engine operating characteristic does NOT exceed the predetermined threshold, the generator 108 continues to pass a fuel/air mixture along the bypass line 144 and continues the bypass operation 301. In some examples, when it is determined (i.e., by the controller 120) that the engine operating characteristic does NOT exceed the predetermined threshold, the bypass operation 301 returns to step 308. In some examples, prior to returning to step 308, the opening of the throttle valve 136 is increased at step 328. In some examples, the opening of the throttle valve 136 can be based on the engine operating characteristic. In some examples, the opening of the throttle valve 136 is progressively increased at a consistent rate during the bypass operation 301.

As the throttle valve opening is increased during the bypass operation 301, an increasing amount of fuel/air mixture is allowed to flow though the CAC 134, thereby displacing stale fuel/air mixture contained within the CAC 134. Specifically during the bypass operation 301, the CAC 134 is progressively cleared of stale fuel/air mixture potentially contained within the CAC 134. The flow of properly mixed fuel/air mixture via the bypass line 144 provides a combustible fuel/air mixture to the cylinders 143 to facilitate combustion within the cylinders 143. As combustion occurs during the bypass operation 301 and engine RPM increases, the throttle valve 136 is progressively opened, thereby allowing an increasing amount of the stale fuel/air mixture to clear from the CAC 134 and progress into the intake manifold 138. While this stale fuel/air mixture has poor combustion qualities, the stale fuel/air mixture from the CAC 134 is mixed and diluted with the combustible fuel/air mixture received at the intake manifold 138 from the bypass line 144. This allows the stale fuel/air mixture to be cleared from the CAC 134 while the fuel/air mixture from the bypass line 144 provides enough combustible mixture to facilitate combustion and continue operation of the engine 109.

Figure 6:
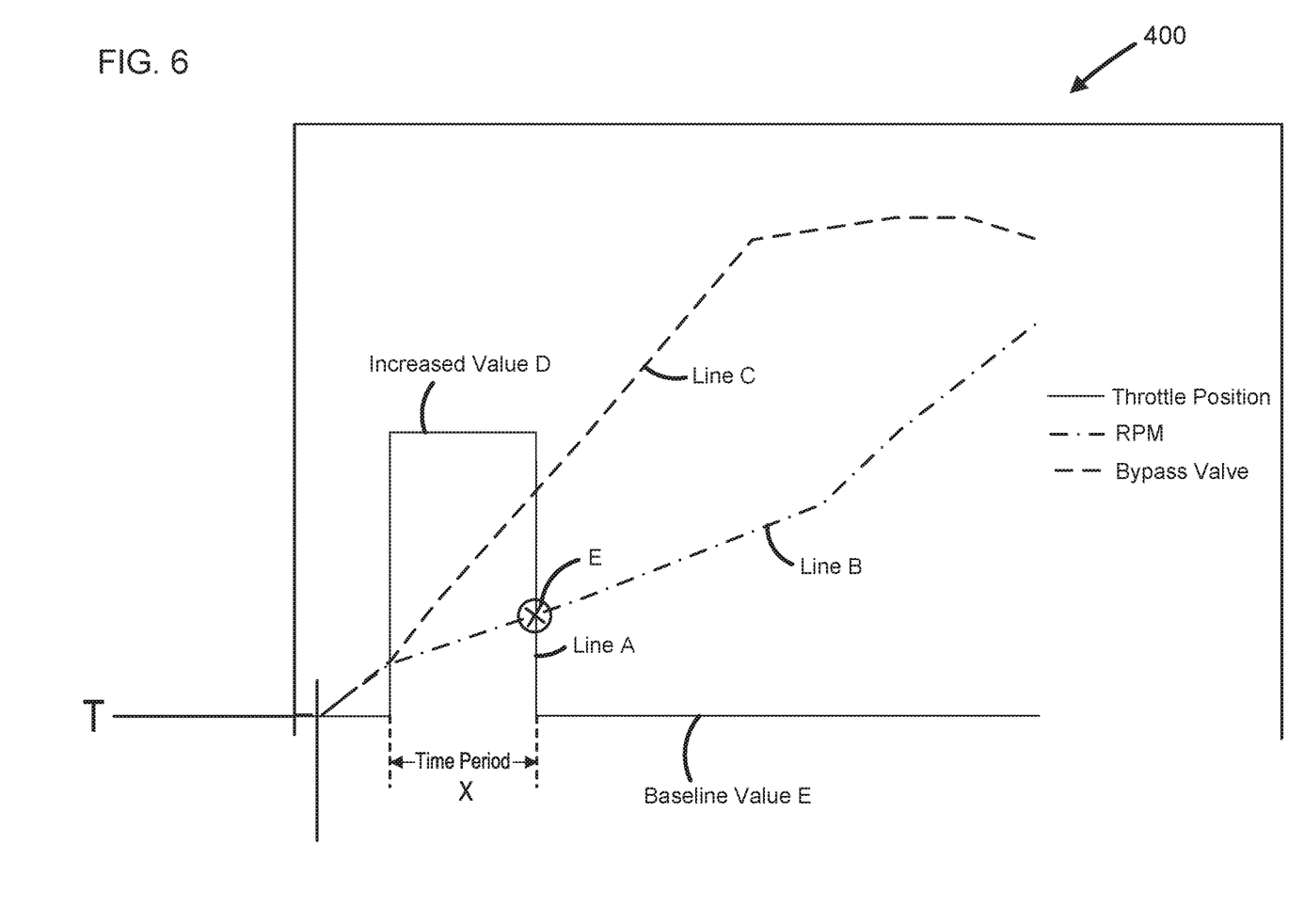
FIG. 6 is schematic chart of the operation of the power backup generator of FIG. 2.

FIG. 6 illustrates a schematic chart 400 representing the operation of the generator over time T (x-axis). The chart 400 includes a Line A representing the position of the bypass valve 146, a Line B representing the operating RPM of the engine 109 of the generator 108, and a Line C representing the position of the throttle valve 136.

Line A is shown to have an increased value D for a time period X before returning to a baseline value E. The baseline value E is representative of the closed position of the bypass valve 146. The increased value D of the Line A during time period X is representative of the open position of the bypass valve 146. Time period X can represent when bypass operation 301 is being performed by the generator 108. In some examples, time period X can be less than or equal to 10 seconds. After the time period X elapses, the generator 108 operates under the normal operation 303.

Lines B and C are depicted having positive slopes as time T increases. Specifically, both lines B and C have positive slopes during the time period X. The increasing slope of line B depicts the increase of engine RPM over time T.

In some examples, the increasing slope of line C depicts the increase of the opening of the throttle valve 136 over time T. Specifically, this increase of the opening of the throttle valve 136 is described with respect to step 328 in connection to FIG. 5, above. In some examples, the slope of Line C (i.e., the opening of the throttle valve 136) can be predetermined so as to optimize the bypass operation 301 and/or the normal operation 303 of the generator 108. In some examples, the slope of Line C can be automatically altered based on a particular engine operating characteristic (e.g., the operating RPM, engine operating temperature, or other like characteristic) to optimize the operation of the generator 108 during the bypass operation 301 and/or the normal operation 303 of the generator 108.

In some examples, line B intersects with Line A at point E at the end of the time period X. In some examples, the RPM value at point E represents a predetermined threshold RPM value that triggers the end of the bypass operation 301 by simultaneously triggering the closing of the bypass valve 146, as described in connection with FIG. 5 above.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

We claim:

1. A method of operating a forced induction gaseous-fueled engine comprising:
    mixing gaseous-fuel and engine intake air to form a mixture at a fuel mixer;
    delivering the mixture to an intake manifold via a bypass mixture line by at least partially bypassing a charge air cooler; and
    providing a throttle valve being positioned between, and in fluid communication with, the charge air cooler and an intake manifold,
    wherein the bypass mixture line is upstream from an inlet of the charge air cooler and the intake manifold and downstream from the throttle valve.

2. The method of claim 1, further comprising at least partially bypassing the charge air cooler for a bypass period.

3. The method of claim 2, wherein the bypass period is a predetermined time interval, wherein the bypass period is less than or equal to 10 seconds.

4. The method of claim 2, wherein the bypass period is a time interval determined by when the gaseous-fueled engine exceeds a predetermined RPM threshold.

5. The method of claim 2, further comprising opening the throttle valve an increasing amount during the bypass period.

6. The method of claim 1, further comprising at least partially closing the throttle valve when bypassing the charge air cooler.

7. The method of claim 1, further comprising a bypass valve positioned in communication with the bypass mixture line.

8. The method of claim 7, further comprising opening the bypass valve when bypassing the charge air cooler.

9. The method of claim 7, further comprising closing the bypass valve when the gaseous-fueled engine exceeds a predetermined RPM threshold.

10. The method of claim 7, further comprising opening the bypass valve for a predetermined bypass period time interval after an initiation of a starting sequence of the engine and closing the bypass valve after the bypass period time interval has elapsed.

11. The method of claim 10, wherein the bypass period time interval is less than or equal to 10 seconds.

12. The method of claim 1, further comprising providing an electricity generating system in communication with the gaseous-fueled engine, wherein an external electrical load is connected to the electricity generating system within 10 seconds from an initiation of a starting sequence of a gaseous-fueled engine.

13. The method of claim 1, further comprising providing electricity to a building via an electricity generating system in communication with the gaseous-fueled engine, wherein normal power is restored to the building within 10 seconds from an initiation of a starting sequence of a gaseous-fueled engine.

14. The method of claim 1, further comprising compressing the mixture utilizing at least one turbocharger.

15. The method of claim 1, wherein the mixture is delivered to the intake manifold via both the bypass mixture line and through the charge air cooler, after at least partially opening the throttle valve.

16. A fuel bypass arrangement for a forced induction gaseous-fueled engine, the fuel bypass arrangement comprising:
a compressed fuel/air mixture line configured to transport a compressed fuel/air mixture;
a charge air cooler positioned between, and in fluid communication with, the compressed fuel/air mixture line and a throttle valve, the charge air cooler being configured to reduce a temperature of the fuel/air mixture as the fuel/air mixture travels from an inlet to an outlet of the charge air cooler;
the throttle valve being positioned between, and in fluid communication with, the charge air cooler and an intake manifold, wherein the throttle valve is configured to control the amount of fuel/air mixture that is delivered to the intake manifold from the charge air cooler;
a bypass line in fluid communication with the compressed fuel/air mixture line, upstream from the inlet of the charge air cooler and the intake manifold and downstream from the throttle valve; and
a bypass valve in fluid communication with the bypass line, the bypass valve being configured to selectively control the flow of the fuel/air mixture through the bypass line.

17. The fuel bypass arrangement of claim 16, further comprising a controller in communication with the bypass valve.

18. The fuel bypass arrangement of claim 17, wherein the controller automatically opens the bypass valve at an initiation of a starting sequence of the gaseous-fueled engine.

19. The fuel bypass arrangement of claim 17, wherein the controller opens the bypass valve for a predetermined bypass period starting when a starting sequence of the gaseous-fueled engine is initiated, and wherein the controller closes the bypass valve when the bypass period has elapsed.

20. The fuel bypass arrangement of claim 17, wherein the controller is in communication with the throttle valve, and wherein the controller at least partially closes the throttle valve when a starting sequence of the gaseous-fueled engine is initiated.

21. The fuel bypass arrangement of claim 16, further comprising at least one fuel/air mixer in communication with at least one compression device, wherein the at least one fuel/air mixer is configured to mix gaseous fuel and engine intake air into a fuel/air mixture, wherein the at least one compression device is configured to compress the fuel/air mixture, and wherein the at least one compression device is in communication with the compressed fuel/air mixture line.

22. A power backup system comprising:
a generator including:
a compression device;
a charge air cooler positioned downstream from the compression device;
an intake manifold positioned downstream from the charge air cooler;
a throttle valve positioned between, and in fluid communication with, the charge air cooler and an intake manifold;
a bypass line connected upstream from the charge air cooler and downstream from the throttle valve, wherein a fuel/air mixture is delivered to the intake manifold via the bypass line by at least partially bypassing the charge air cooler;
a combustion system for generating mechanical power; and
an electricity generating system for generating electrical power from the combustion system.

23. The power backup system of claim 22, wherein the transfer switch automatically senses an electrical power loss of the main power source, and wherein, when the transfer switch senses the power loss of the main power source, the transfer switch connects the electrical load to the generator.

24. The power backup system of claim 22, further comprising a transfer switch connected to an electrical load, the generator, and a main power source, wherein the transfer switch is configured to connect the electrical load to either the generator or the main power source.

25. The power backup system of claim 22, wherein, when the transfer switch senses the power loss of the main power source, normal power is restored to the electrical load within 10 seconds from when a starting sequence of the generator is initiated.

\* \* \* \* \*